United States Patent [19]

Sidorovich et al.

[11] 4,145,744

[45] Mar. 20, 1979

[54] STATISTICAL ANALYZER OF WORKING PROCESS PARAMETERS OF MACHINERY

[75] Inventors: Vladimir G. Sidorovich; Alexandr V. Dokukin; Evgeny M. Shmarian; Vladimir V. Kazakov, all of Moscow; Alexandr I. Lepikhov, Konotop Sumskoi oblasti, all of U.S.S.R.

[73] Assignee: Institut Gornogo Dela Imeni A.A. Skochinskogo, Moscow, U.S.S.R.

[21] Appl. No.: 817,530

[22] Filed: Jul. 19, 1977

[51] Int. Cl.² .................. G01D 1/14; H03K 13/175
[52] U.S. Cl. .......................... 364/554; 235/92 MT; 328/150; 364/551
[58] Field of Search ............. 364/550, 507, 551, 554, 364/556, 557, 560, 561, 569; 235/92 MT, 92 NT; 328/150

[56] References Cited

U.S. PATENT DOCUMENTS

| | | | |
|---|---|---|---|
| 3,458,721 | 7/1969 | Maynard | 328/150 |
| 3,733,424 | 5/1973 | Pitts et al. | 235/92 MT |
| 3,939,331 | 2/1976 | Theurer et al. | 364/556 |
| 3,955,070 | 4/1976 | Suzuki et al. | 235/92 MT |

*Primary Examiner*—Felix D. Gruber
*Attorney, Agent, or Firm*—Haseltine, Lake & Waters

[57] ABSTRACT

The proposed statistical analyzer comprises a converter of physical quantities to voltage, connected to direct inputs of comparators whose number corresponds to that of voltage quantization levels. The analyzer also includes adders. One input of each adder is connected to the output of a standard voltage generator; the output of each adder is connected to the inverting input of a comparator. The output of each comparator is connected to the second input of each adder corresponding to a quantization level which is one level below the quantization level corresponding to this comparator. The statistical analyzer of this invention is marked by a high accuracy and reliability and makes it possible to obtain a bar chart of any working process parameter of a machine.

1 Claim, 1 Drawing Figure

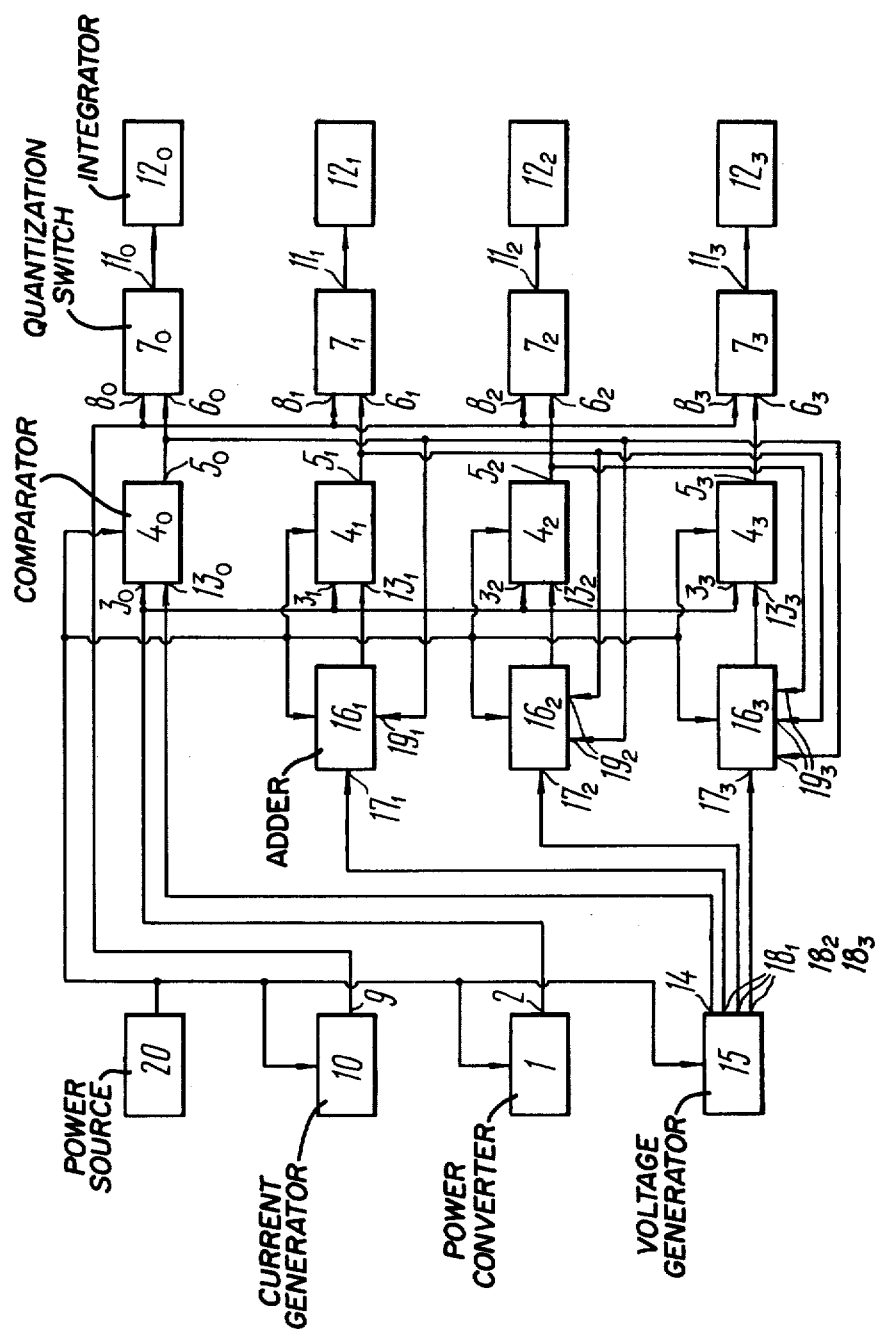

STATISTICAL ANALYZER OF WORKING PROCESS PARAMETERS OF MACHINERY

The present invention relates to monitoring and measuring devices intended for statistical analysis of electric signals and, more particularly, to a statistical analyzer of working process parameters of machinery.

The statistical analyzer of this invention is applicable, in the main, to monitoring working process parameters of mining machines, as well as of different electrical and mechanical equipment.

The monitoring of working process parameters ensures a high efficiency of machinery and equipment. The working processes of mining, construction, road-building and agricultural machinery, as well as transport vehicles, which are subjected to the effects of great dynamic loads, are of a markedly random and unstable nature. Actual values of working process parameters of machinery, such as power, moment, force, pressure, speed, temperature, and current, can be converted to random electric signals by means of converters of physical quantities. Hence, working process parameters of machinery can be monitored by statistically analyzing electric signals.

The existing monitoring and measuring equipment does not make it possible to monitor parameters of machines' working processes during operation, or throughout the life of a machine, or at least some part of its service life.

The sphere of application of the known statistical analyzers of working process parameters of machinery is limited by their low reliability and accuracy.

There is known a statistical distribution analyzer which comprises a set of contacts mounted on a level recorder, and a unit containing a pulse oscillator and thirteen electromechanical counters, of which twelve are used to register level distribution (cf. The Products Catalog of the Danish firm Bruel and Kier). As voltage is applied to the input of the recorder, the pulse oscillator sends its pulses via one of the contacts to the counter which registers the duration of a signal at a given level. Displays of the counters are indicative of the distribution of the electric signal being monitored.

The analyzer under review does not make it possible to analyze signals at a frequency of more than 1 to 2 Hz and has a limited memory capacity, designed for a maximum of 24 hours of continuous operation. As a result, the analyzer cannot be used for analyzing signals over a prolonged period of time, for example, a week, a month or a year. The analyzer must be complete with a level recorder; it has a big size and low reliability due to the presence of mechanical contacts. These factors do not allow on site application of the analyzer.

There is also known a statistical analyzer of working process parameters of machinery, comprising a converter of physical quantities, which characterize the operating conditions of machinery, into voltage. To the output of said converter there are connected the direct inputs of n comparators whose number is equal to that of voltage quantization levels. The output of each of said comparators is connected to the control input of a respective switch. The second input of each comparator is connected to the output of a stabilized pulse current generator. The output of each comparator is connected to a respective recorder. The inverting input of each comparator is electrically coupled to a respective output of a standard voltage generator (cf. USSR Inventor's Certificate No. 436,371, Cl. G607 c).

The latter statistical analyzer further includes diodes, the plate of each of said diodes being connected to the inverting input, whereas the cathode of each of said diodes is connected to the output of the switch of a given quantization level and to the inverting input of the comparator of the next lower level. The recorders are electrochemical mercury integrators.

The analyzer in question has no more than three quantization levels; its adjustment is extremely complicated, whereas the accuracy and reliability are low.

It is an object of the present invention to provide a statistical analyzer of working process parameters of machinery, featuring improved accuracy and reliability.

The foregoing object is attained by providing a statistical analyzer of working process parameters of machinery, comprising a converter of physical quantities, which characterize the operating conditions of machinery, into voltage, to whose output there are connected direct inputs of a plurality of n comparators, the number of said comparators being equal to that of voltage quantization levels, the output of each of said comparators being connected to the control input of a respective switch, the second input of each of said switches being connected to the output of a stabilized pulse current generator, the output of each of said switches being connected to a respective recorder, whereas the inverting input of each of said comparators is electrically coupled to a respective output of a standard voltage generator, which statistical analyzer includes, according to the invention, (n − 1) adders, one input of each of said adders being connected to a respective output of the standard voltage generator, the output of each of said adders being connected to the inverting inputs of comparators corresponding to the quantization levels from the lowest to the highest but one, the output of each comparator being connected to the second input of each adder corresponding to a quantization level which is one level below the quantization level corresponding to this comparator.

The proposed statistical analyzer is marked by a high accuracy and reliability and is easy to adjust.

Other objects and advantages of the present invention will be more readily understood from the following detailed description of a preferred embodiment thereof to be read in conjunction with the accompanying drawing which is a block diagram of a statistical analyzer of working process parameters of machinery, in accordance with the invention.

Referring to the drawing the proposed statistical analyzer of working process parameters of machinery comprises a converter 1 of physical quantities to voltage. The physical quantities, which characterize the operating conditions of machinery, may include, for example, the power input of a motor, the torque of a transmission, axial and radial forces applied to a machine's actuator, the pressure in a drive's hydraulic system, the temperature of electromotor windings, and motion of a machine.

Connected to an output 2 of the converter 1 are direct inputs $3_0$, $3_1$, $3_2$ and $3_3$ of n comparators $4_0$, $4_1$, $4_2$ and $4_3$ whose number corresponds to that of voltage quantization levels.

The outputs $5_0$, $5_1$, $5_2$ and $5_3$ of each comparator $4_0$, $4_1$, $4_2$ and $4_3$ are connected to a control input $6_0$, $6_1$, $6_2$ and $6_3$ of a respective switch $7_0$, $7_1$, $7_2$ and $7_3$ to whose second input $8_0$, $8_1$, $8_2$ and $8_3$ there is connected an output 9 of a stabilized pulse current generator 10. An output $11_0$, $11_1$, $11_2$ and $11_3$ of each switch $7_0$, $7_1$, $7_2$ and $7_3$ is connected to a respective recorder $12_0$, $12_1$, $12_2$ and $12_3$. In the embodiment under review, the recorders 12 are electrochemical mercury integrators (cf. the products catalogue of Takelec Airtronic of 1972). The function of a recorder 12 can also be performed by an electromechanical counter.

In the embodiment under review, the comparator 4 is built around an operational amplifier. The switch 7 is a microcircuit transistor switch (cf. The Handbook of Semiconductor Electronics, ed. by Lloyd P. Hunter). An inverting input $13_0$, $13_1$, $13_2$ and $13_3$ of the comparator $4_0$, $4_1$, $4_2$ and $4_3$ corresponding to the highest quantization level is electronically coupled to an output 14 of a standard voltage generator 15.

The statistical analyzer futher includes (n − 1) adders $16_1$, $16_2$ and $16_3$. One input $17_1$, $17_2$ and $17_3$ of each adder $16_1$, $16_2$ and $16_3$ is connected to a respective output $18_1$, $18_2$ and $18_3$ of the standard voltage generator 15.

The standard voltage generator 15 applies voltage to the input $13_0$, $13_1$, $13_2$ and $13_3$ of each comparator $4_0$, $4_1$, $4_2$ and $4_3$ via a corresponding adder $16_1$, $16_2$ and $16_3$. The magnitude of this voltage corresponds to a voltage quantization level which corresponds to the respective comparator $4_0$, $4_1$, $4_2$ and $4_3$.

Outputs of the adders $16_1$, $16_2$ and $16_3$ are connected to the inputs $13_1$, $13_2$ and $13_3$ of the comparators $4_1$, $4_2$ and $4_3$ corresponding to the quantization levels from the lowest to the highest but one. The output $5_1$, $5_2$ and $5_3$ of each comparator $4_1$, $4_2$ and $4_3$ is connected to another input $19_1$, $19_2$ and $19_3$ of each adder 16, which corresponds to a quantization level that is one level below the quantization level corresponding to this comparator $4_1$, $4_2$ and $4_3$. Thus the number of inputs $19_1$, $19_2$ and $19_3$ of each adder $16_1$, $16_2$ and $16_3$ increases as the quantization level goes down.

The statistical analyzer also includes a power source 20 connected to the converter 1, the comparators $4_0$, $4_1$, $4_2$ and $4_3$, the stabilized pulse current generator 10, the adders $16_1$, $16_2$ and $16_3$, and the standard voltage generator 15.

The proposed statistical analyzer of working process parameters of machinery operates as follows.

The converter 1 of physical quantities to voltage is a power converter. The voltage at the output of this converter corresponds to the actual power intake of a machine's electromotor. In the embodiment under review, there are four voltage quantization levels.

Consider a case when voltage at the output 2 of the power converter 1 is in excess of that of the first, or the lowest, quantization level and, consequently, in excess of the voltage across the direct input $3_0$ of the comparator $4_1$. From the standard voltage generator 15, standard voltage is applied to the inverting input $13_1$ of the comparator $4_1$ via the adder $16_1$. As this takes place, at the output $5_1$ of the comparator $4_0$ there is produced a signal which is applied to the input $6_0$ of the first quantization level switch $7_0$. The switch $7_0$ is driven into conduction, and current flows from the output 9 of the stabilized pulse current generator 10 through the electrochemical mercury integrator $12_0$. The latter's scale is graduated in hours, hence, the reading of the integrator makes it possible to find, without any conversion, the time during which the machine's electromotor has worked at a power output within the range between the first and second quantization levels.

As soon as the voltage at the output 2 of the power converter 1 is in excess of that of the second quantization level, i.e. as soon as the voltage at the direct input $3_1$ of the comparator $4_1$, corresponding to the second quantization level, is in excess of the voltage at the inverting input $13_1$ of said comparator $4_1$, at the latter's output $5_1$ there is produced a signal which is applied to the input $6_1$ of the switch $7_1$ corresponding to the second quantization level. The switch $7_1$ is driven into conduction, and current flows from the output 9 of the stabilized pulse current source 10 through the electrochemical mercury integrator $12_1$. As this takes place, the integrator $12_1$ registers the time during which the machine's electromotor has worked at an input power within the range between the second and third quantization levels. Simultaneously, a signal from the output $5_1$ of the comparator $4_1$, corresponding to the second quantization level, is applied to one of the inputs $19_2$ of the adder $16_2$ corresponding to the third quantization level. As a result, voltage at the output of the adder $16_2$ and, consequently, voltage at the inverting input $13_2$ of the comparator $4_2$ corresponding to the third quantization level becomes greater than the voltage across the direct input $3_2$ of the comparator $4_2$. The signal at the output $5_2$ of the comparator $4_2$ becomes zero, and the switch $7_2$ is rendered non-conducting, so no current is passed to the electrochemical mercury integrator $12_2$ corresponding to the third quantization level.

Whenever voltage across the output 2 of the power converter 1 is in excess of each next, higher, quantization level, current is passed through the electrochemical mercury integrator 12 corresponding to this quantization level, but is not passed through the electrochemical mercury integrator 12 corresponding to the previous, lower, quantization level.

When voltage across the output 2 of the power converter 1 is in excess of the fourth, or the highest, quantization level, current is only passed through the electrochemical mercury integrator $12_3$ corresponding to the fourth quantization level, and there is registered the time during which the machine's electromotor operates at a power output above the fourth and last quantization level.

If subsequently there is a drop in the voltage across the output 2 of the power converter 1, current is passed through the electrochemical mercury integrator 12 corresponding to the given quantization level, but is not passed through the electrochemical mercury integrator 12 corresponding to the previous, higher quantization level.

At each moment of time, current only flows through a single electrochemical mercury integrator 12 which registers the time during which the machine's electromotor runs at a power output within the range between the actual and the next, higher, quantization levels.

Thus the statistical analyzer of the present invention makes it possible to determine power level distribution, or obtain an input power bar chart of a machine's electromotor.

Bar charts of other working process parameters of machinery are obtained through the use of an appropriate physical quantity-to-voltage converter. The statistical analyzer of this invention is highly accurate, reliable and easy to adjust.

What is claimed is:

1. A statistical analyzer of working process parameters of machinery, comprising:

a converter of physical quantities, which characterize operating conditions of machinery, to voltage;

a plurality of comparators, whose number is equal to that of voltage quantization levels, each having a direct input connected to the output of said converter of physical quantities to voltage, and an output;

a plurality of switches, each having a control input connected to the output of a respective comparator, and an output;

a stabilized pulse current generator having an output connected to a second input of a respective switch;

a plurality of recorders connected to said outputs of said respective switches;

a plurality of adders corresponding to the voltage quantization levels from the lowest to the highest but one, each having an output connected to a respective comparator, and a group of inputs;

a standard voltage generator having a group of outputs connected to a respective adder, and an output connected to that of said comparators which corresponds to the highest quantization level, and an input;

the output of each of said comparators being connected to said input of said group of inputs of a respective adder correspondong to a quantization level which is one level below the quantization level corresponding to this comparator;

a power source connected to said converter of physical quantities to voltage, said comparators, said standard voltage generator and said adders.

* * * * *